United States Patent
Saha et al.

(10) Patent No.: US 7,110,396 B2
(45) Date of Patent: Sep. 19, 2006

(54) SYSTEM FOR TRANSPORTING SUB-RATE DATA OVER A COMMUNICATION NETWORK

(75) Inventors: Angshuman Saha, Sunnyvale, CA (US); Andre Archambault, San Jose, CA (US); Carlos Henriquez, San Jose, CA (US)

(73) Assignee: CIENA Corporation, Linthicum, MD (US)

( * ) Notice: Subject to any disclaimer, the term of this patent is extended or adjusted under 35 U.S.C. 154(b) by 904 days.

(21) Appl. No.: 09/933,991

(22) Filed: Aug. 20, 2001

(65) Prior Publication Data
US 2003/0055998 A1    Mar. 20, 2003

(51) Int. Cl.
*H04L 12/66* (2006.01)
*H04J 3/16* (2006.01)
*H04J 3/24* (2006.01)

(52) U.S. Cl. ............... 370/356; 370/466; 370/474
(58) Field of Classification Search ........ 370/352–356, 370/395.5, 466, 474, 535–539
See application file for complete search history.

(56) References Cited

U.S. PATENT DOCUMENTS

| | | | | |
|---|---|---|---|---|
| 5,461,622 A | * | 10/1995 | Bleickardt et al. | 370/470 |
| 6,222,848 B1 | * | 4/2001 | Hayward et al. | 370/412 |
| 6,400,730 B1 | * | 6/2002 | Latif et al. | 370/466 |
| 6,430,201 B1 | * | 8/2002 | Azizoglu et al. | 370/535 |
| 6,584,118 B1 | * | 6/2003 | Russell et al. | 370/466 |
| 6,636,559 B1 | * | 10/2003 | Kakura | 375/150 |
| 6,765,933 B1 | * | 7/2004 | Michel et al. | 370/539 |
| 6,819,679 B1 | * | 11/2004 | Kerns et al. | 370/474 |
| 6,847,644 B1 | * | 1/2005 | Jha | 370/392 |

* cited by examiner

*Primary Examiner*—Chi Pham
*Assistant Examiner*—Melanie Jagannathan
(74) *Attorney, Agent, or Firm*—Dougherty Clements; Christopher L. Bernard; Tyler S. Brown

(57) ABSTRACT

System for transporting a sub-rate data stream over a communication network using a selected network protocol. The sub-rate data stream has an associated sub-rate protocol. The system includes a rate adapter to receive the sub-rate data stream and adapt a rate characteristic asso=iated with the sub-rate protocol to a rate characteristic associated with the selected network protocol to generate a rate-adapted data stream. The system also includes a payload framer to receive the rate-adapted data stream and frame the rate-adapted data stream into a payload for transmission over the communication network using the selected network protocol.

60 Claims, 11 Drawing Sheets

SYSTEM FOR TRANSPORTING SUB-RATE DATA OVER A COMMUNICATION NETWORK

FIELD OF THE INVENTION

The present invention relates generally to communication systems, and more particularly, to a system for transporting sub-rate data over a communication network.

BACKGROUND OF THE INVENTION

Communication systems, such as communication networks, are being increasingly used to transmit large amounts of data from point to point. For example, a local area network may be used to provide data transmission services for a small corporation, or a wide area network may be used to provide data transmission services for nationwide users.

One requirement of communication networks is to be able to transmit data from point to point for different users simultaneously. However, the network users may provide their data to the network using different data rates and encoded using different transmission protocols. For example, one data protocol that may be used is referred to as FibreChannel (FC) and has a data rate of approximately 1.0625 gigabits per second. Another protocol that may be used is referred to as Enterprise Systems Connection (ESCON) and has a data rate of approximately 200 megabits per second. Still another protocol that may be used is referred to as Gigabit Ethernet (GigE) and has a data rate of approximately 1.25 gigabits per second. Thus, given the availability and use of various transmission protocols, the problem of efficient network utilization arises.

Generally, today's communication networks are designed to transmit data at very high data rates. For example, the communication network may be a Synchronous Optical Network (SONET) that transmits data at a rate of approximately 2.5 gigabits per second. Thus, to dedicate such a high-speed network transmission path to transmit relatively low-rate data, i.e., ESCON data, would be wasteful and inefficient, since it is obvious that the network transmission path would go underutilized.

One solution to transmitting sub-rate data streams encoded with different protocols is to interpret or extract the data from its respective protocol and then re-map the extracted data within the high speed network protocol for transmission over the communication network. However, if the data is contained in high layers of its respective protocol, there is a need to have a data level processor to interpret the data protocol to retrieve the data prior to re-mapping and transmitting the data via the high speed network protocol. Furthermore, at the receiving end, it is necessary to have another processor to extract the data from the network protocol and re-encode the data back into the correct layers of its original protocol. This results in a very complex and expensive system that may have the effect of introducing large amounts of data latency.

FIG. 1 shows a portion of a typical network element 100 that receives user data for transmission over a communication network. For example, the communication network may be a wide area network that includes one hundred or more network elements interconnected to form various network transmission paths. At each network element, data signals may be added or dropped from the network, thereby allowing data signals to be added to the network at a source network element and dropped from the network at a destination network element that may be some distance away from the source. Data signals added to the network may be received at the source network element in one of several protocols, where each protocol has an associated data rate. For clarity purposes, only the transmission portion of the network element 100 is shown, however, a receive portion may exist that has corresponding functional blocks to reverse the pretransmission process.

The network element 100 includes a network protocol processor 102 that is coupled to the communication network and capable of transmitting data using a selected network protocol for high-speed transmission over the communication network. For example, the communication network may be a SONET network and the network protocol may be the OC-48 protocol.

The network element 100 is shown receiving three packet streams for transmission, where each packet stream is encoded using a different transmission protocol. For example, packet stream 1 is encoded using protocol A, packet stream 2 is encoded using protocol B, and packet stream 3 is encoded using protocol C. For example, protocol A may be the FibreChannel protocol, protocol B may be the ESCON protocol, and protocol C may be the GigE protocol.

The network element 100 includes a protocol A receiver 104, a protocol B receiver 106, and a protocol C receiver 108. The components 104, 106, and 108 are capable of receiving data encoded in the various transmission protocols for transmission over the network.

The components 104, 106, and 108 are coupled to corresponding packet interpreters 110, 112, and 114 that operate to interpret or extract data from each stream. The data output from the packet interpreters 110, 112, and 114 are coupled to the network protocol processor 102 that re-encodes the data into the high-speed network protocol for transmission over the network. The reverse of the above process is needed at each receiving network element to extract the received data from the network protocol and re-encode the data back into its original protocol.

As demonstrated above, one problem with current systems is that separate packet interpreters are used for each data protocol received. For example, the network element 100 is required to have a specific packet interpreter for each received data stream, since each stream is encoded using a different protocol. This adds complexity to the network element and limits its flexibility since the network element must be set up in advance to receive and interpret specific data stream protocols. Furthermore, this complexity and cost extends to both the transmitting and receiving network elements.

Another problem with current systems is that to interpret the packets of each protocol, data buffering may be required to temporarily store the interpreted data before or during the interpreting or re-encoding processes. The data buffering introduces data latency, since data contained in each interpreted packet now takes additional time to reach its final destination.

Therefore, it is desirable to have a system that allows data streams, encoded using different and relatively low-speed transmission protocols, to be transported over a communication network using a high-speed network protocol without having a special interpreter for each protocol and without introducing additional data latency due to delays that occur during packet interpretation and re-encoding as provided by current systems.

SUMMARY OF THE INVENTION

The present invention includes a system for transporting one or more sub-rate data streams over a communication network using a selected network protocol. The system can receive the sub-rate data streams encoded using different protocols and transparently frame these data streams into a data payload that is loaded into a network frame and transmitted over a high-speed communication network using a network protocol. The system frames the sub-rate streams without using protocol interpreters to interpret the sub-rate data, and in doing so, avoids the problems of complexity, cost and data latency present in conventional systems.

In one embodiment, the system frames data streams that are not aligned (i.e., encoded with different protocols) into a network payload without having to interpret the data streams. The system supports different data protocols and includes a sub-rate protocol processor that transparently frames multiple sub-rate data into a high-speed network data stream with low data latency. In one embodiment, the system combines different sub-rate data received at a source network element, to form a high-speed data stream for network transmission to a destination network element. In another embodiment, the system can effectively switch sub-rate data from network element to network element, since sub-rate data can be selectively added or dropped from the high-speed network data stream at any selected network element.

In one embodiment, the system is comprised of a first circuit pack and associated software, located at a source network element, that operates to receive one or more sub-rate data streams that use any of several different protocols and frame the sub-rate data streams into a payload for transmission over a communication network using a high-speed transmission protocol. The system also includes a second circuit pack and associated software, located at a destination network element, that operates to receive the payload from the communication network and de-frame the payload to reassemble the sub-rate data streams in their original protocol.

In one embodiment of the invention, apparatus is provided for transmitting a sub-rate data stream over a communication network that uses a selected network protocol. The sub-rate data stream having an associated sub-rate protocol. The apparatus comprising a rate adapter coupled to receive the sub-rate data stream and operable to adapt a rate characteristic associated with the sub-rate protocol to a rate characteristic associated with the selected network protocol to generate a rate-adapted data stream from the sub-rate data stream. The apparatus also comprises a payload framer coupled to receive the rate-adapted data stream and operable to frame the rate-adapted data stream into a payload for transmission over the communication network using the selected network protocol.

In another embodiment of the invention, apparatus is provided for receiving a sub-rate data stream over a communication network that uses a selected network protocol. The sub-rate data stream having an associated sub-rate protocol. The apparatus comprising a payload de-framer coupled to receive a payload transmitted over the communication network using the selected network protocol and to de-frame the payload into a rate-adapted data stream that is representative of the sub-rate data stream. The apparatus also comprising a rate adapter coupled to receive the rate-adapted data stream and operable to adapt a rate characteristic associated with the selected network protocol to a rate characteristic associated with the sub-rate protocol to generate the sub-rate data stream from the rate-adapted data stream.

In another embodiment of the invention, a method is provided for transmitting a sub-rate data stream over a communication network that uses a selected network protocol. The sub-rate data stream has an associated sub-rate protocol. The method comprising steps of adapting a rate characteristic associated with the sub-rate protocol to a rate characteristic associated with the selected network protocol to generate a rate-adapted data stream from the sub-rate data stream, and framing the rate-adapted data stream into a payload for transmission over the communication network using the selected network protocol.

In another embodiment of the invention, a method is provided for receiving a sub-rate data stream over a communication network that uses a selected network protocol. The sub-rate data stream has an associated sub-rate protocol. The method comprises steps of de-framing a payload transmitted over the communication network using the selected network protocol into a rate-adapted data stream that is representative of the sub-rate data stream, and adapting a rate characteristic associated with the selected network protocol to a rate characteristic associated with the sub-rate protocol to generate the sub-rate data stream from the rate-adapted data stream.

BRIEF DESCRIPTION OF THE DRAWINGS

The foregoing aspects and the attendant advantages of this invention will become more readily apparent by reference to the following detailed description when taken in conjunction with the accompanying drawings wherein.

DETAILED DESCRIPTION OF THE INVENTION

The present invention includes a system for transporting one or more sub-rate data streams over a communication network using a selected network protocol. One or more embodiments included in the present invention will now be described, however, it is possible to make changes and variations to the described embodiments without deviating from the scope of the present invention.

The terms "sub-rate data" or "sub-rate data stream" are used herein to describe data that utilizes a protocol that is different from a network protocol used to transmit data over a communication network. The terms also refers to a data stream, to be transmitted over a communication network, that has an effective data rate equal to or less than a data rate associated with the communication network protocol. The effective data rate is the rate of the data stream after taking into account any rate reducing processes, such as data compression or encoding.

Furthermore, the term "data" is used herein in a generic sense to mean virtually any type of information such as, numerical information, voice, video, audio, or any other type of information that can be transported over a communication network. Therefore, embodiments included in the present invention are not limited and may be used in conjunction with transporting virtually any type of information.

Figure 1:
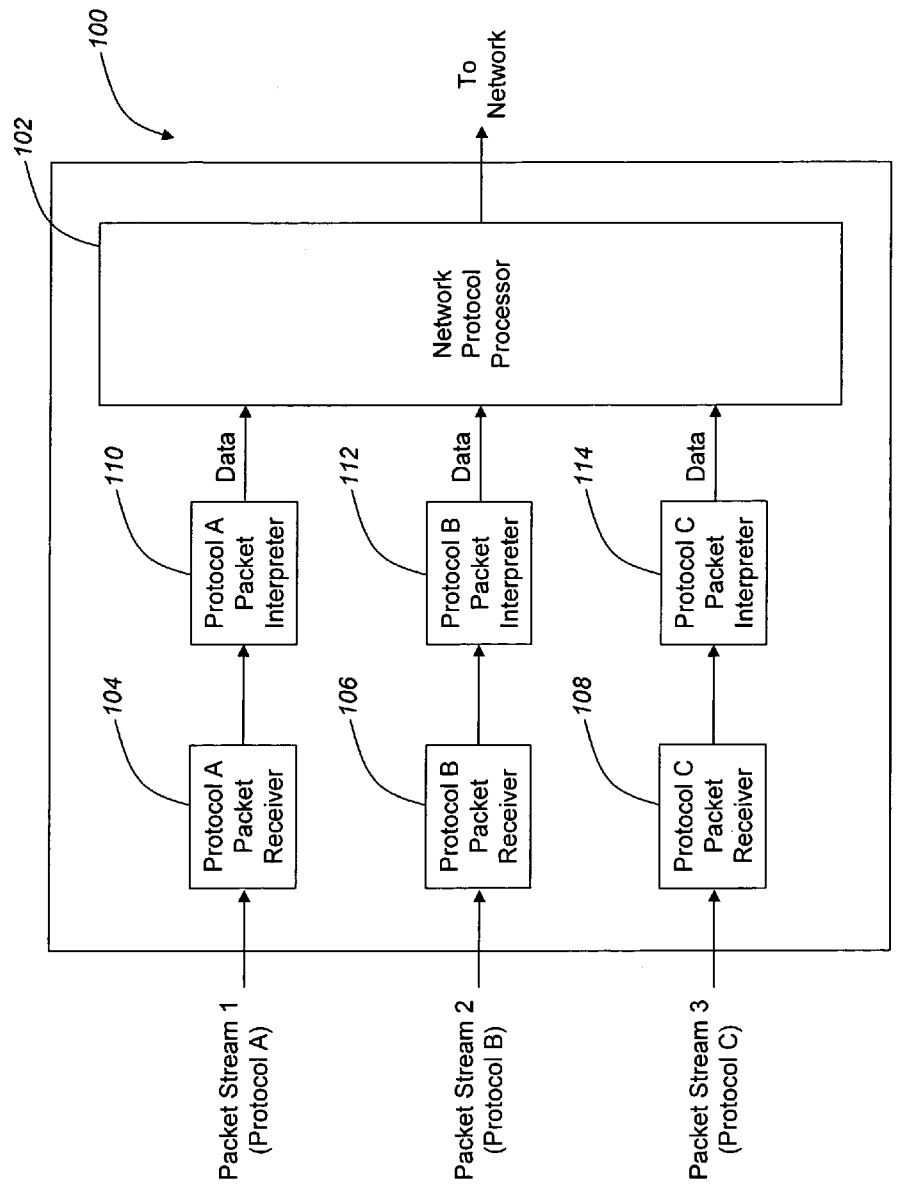
FIG. 1 shows a portion of a typical network element used to receive and transmit sub-rate data streams.
Figure 2:
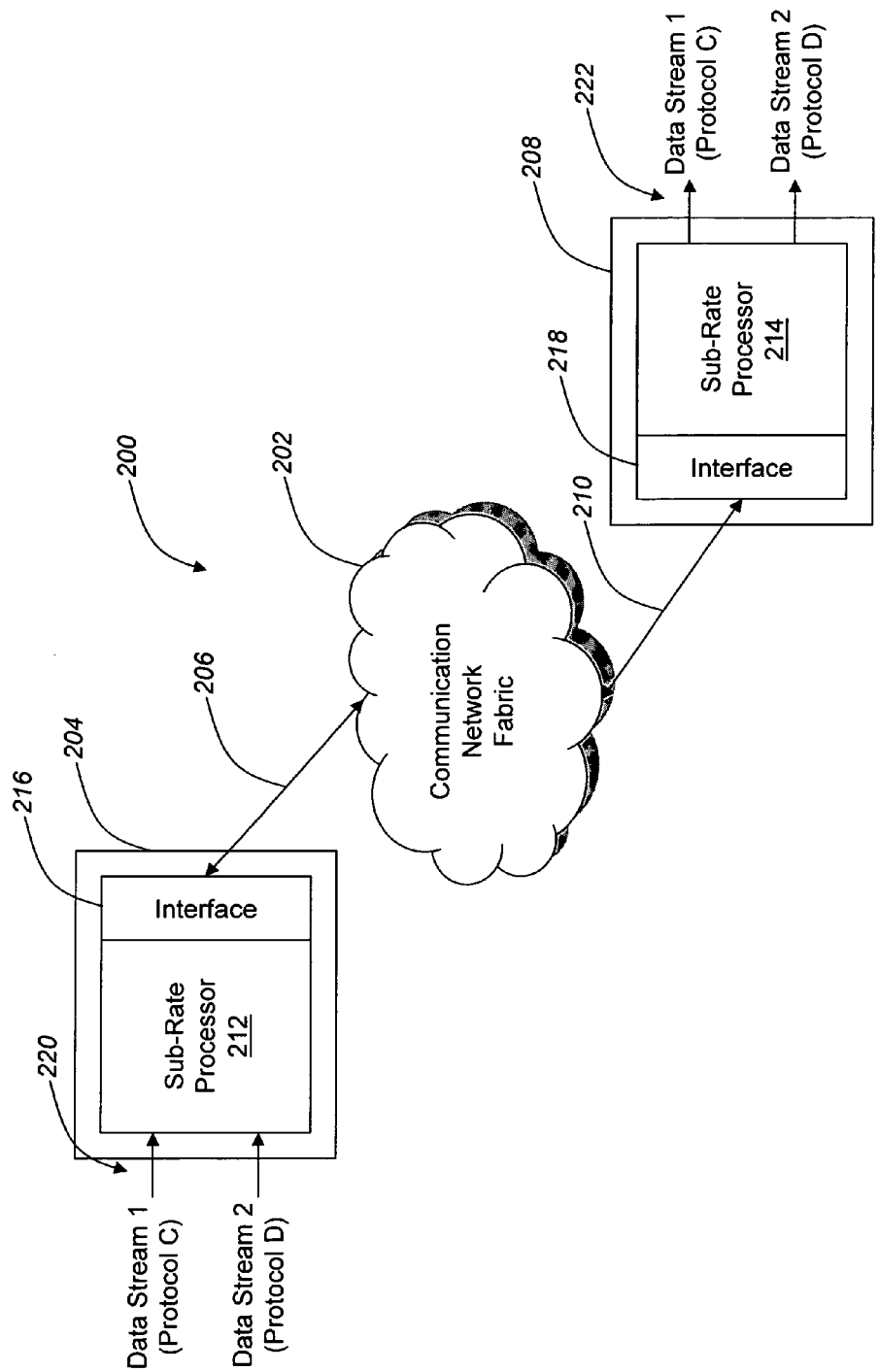
FIG. 2 shows a portion of a communication network that includes a sub-rate data protocol processor constructed in accordance with the present invention.

FIG. 2 shows a portion of a communication network 200 that includes sub-rate data protocol processors constructed in accordance with the present invention. The communication network 200 includes a network fabric 202 that provides network transmission paths between network elements within the fabric that allow data to be routed throughout the fabric 202. The communication network may be an optical or electrical network that uses optical or electrical transmission links. The network may also include wireless transmission links so that network 200 may be comprised, wholly or partially, of optical, electrical or wireless systems and transmission paths in any combination. Furthermore, the communication network 200 may comprise any type of network architecture. For example, the network 200 may be a point to point network, ring network or a mesh network. Thus, embodiments of the invention are suitable for use with virtually any type of network architecture implemented using any communication technology, i.e., optical, electrical, wireless, etc.

A first network element 204 is coupled to the fabric 202 via a first high-speed bi-directional communication link 206. A second network element 208 is coupled to the fabric via a second high-speed bi-directional communication link 210. The network elements 204, 208 can use their respective connections to the fabric 202 to transmit data to each other using a high-speed network protocol. For example, the communication network may comprise an STS-48 protocol carried over fiber and each bi-directional link can transmit and receive data at approximately 2.5 gigabits per second. However, the invention is not limited to use with a particular type of communication network, and as a result, one or more embodiments of the present invention are suitable for use with virtually any type of communication network.

The network elements 204, 208 include sub-rate protocol processors 212, 214, respectively, that are constructed and operated in accordance with the present invention. The sub-rate protocol processors operate to transmit and receive sub-rate data streams encoded using one of many possible protocols. Received sub-rate data streams are combined into a high-speed network protocol for transmission over the communication network. Network interfaces 216, 218 are used to interface the sub-rate protocol processors to the network fabric 202.

As shown in FIG. 2, the sub-rate protocol processor 212 receives as input, data stream 1 and data stream 2. The data streams are encoded using protocol C and protocol D, respectively. For the purposes of clarity, it will be assumed that protocol C is the FC protocol and that protocol D is the GigE protocol. Thus, data stream 1 is received at approximately 1.0625 Gigabits per second and data stream 2 is received at approximately 1.25 Gigabits per second. However, the sub-rate protocol processor 212 is not limited to receiving only data having these protocols. In fact, the sub-rate protocol processors are operable to receive data using virtually any protocol.

In accordance with the present invention, the sub-rate protocol processor 212 receives data streams at inputs referred to as input tributaries 220. The number of input tributaries 200 provided by the sub-rate protocol processor 212 is scalable so that varying numbers of sub-rate data streams may be received. The received sub-rate data streams are framed into one output stream for transmission over the communication network. For example, if the communication network is a SONET network using OC-48, the bi-directional link 206 can transmit data over the communication network at approximately 2.5 gigabits per second. In accordance with the present invention, data stream 1 and data stream 2 can be transparently framed to form a single high-speed data stream for transmission over the network. For example, data stream 1 has a data rate of approximately 1.0625 Gigabits per second and data stream 2 has a data rate of approximately 1.25 Gigabits per second, which means that the two data streams can be framed together to form a single stream that can be transmitted within the approximately 2.5 gigabits per second available over the bi-directional link.

Therefore, one or more embodiments of the present invention allow one or more sub-rate data streams to be framed to form a single data stream for transmission over a communication network. This process is scalable to any number of input tributaries and data rates, so that any combination of input data streams may be combined for transmission as long as the combined data rate (accounting for encoding or compression) is less than or equal to the transmission rate available over the bi-directional link. Thus, although described with reference to two input data streams utilizing the FC and GigE protocols, any number of data streams using any types of transmission protocols can be combined provided the overall data rate can be supported by the transmission speed of the network (i.e., the condition described above is met). Furthermore, any type of compression or encoding scheme can be used on the sub-rate data streams to meet the above-described condition.

At the receiving network element 208, the sub-rate protocol processor 214 receives the high-speed data stream via the interface 218, de-frames the data, and forms output data streams at output tributaries 222 that have the same protocol as the corresponding input streams received at the transmitting network element 204. For example, data stream 1 was received using the FC protocol at the transmitting network element 204, and will be output in that same protocol from the receiving node 208 at one of the output tributaries 222.

Therefore, one or more embodiments of the present invention provide a system that receives one or more sub-rate data streams, frames the received sub-rate streams to form a single high-rate data stream, transmits the high-rate data stream over a communication network, receives the high-rate data stream at a receiving network element, de-frames the high-rate data streams and outputs the sub-rate data streams at the receiving network element using the same protocol as initially received. The system is scalable to allow a varying number of sub-rate streams using a variety of protocols to be framed into a single high-rate stream for network transmission.

The above-described embodiment illustrates how sub-rate data streams having the same source and same destination network elements can be combined and transmitted over a high-speed network communication link. However, in one or more embodiments of the invention, the sub-rate data streams may have different source or destination network elements. In this case, it is possible to switch a sub-rate data stream at selected network elements, and in doing so, selectively frame and de-frame that sub-rate data stream with other sub-rate data streams. For example, if two sub-rate streams at a source network element have different destinations, the two sub-rate streams may be framed together and transmitted via a high-speed network link to a first network element, whereat the sub-rate streams are de-framed (and possibly framed with other sub-rate streams) and switched to second and third network elements, respectively. In effect, the sub-rate streams may travel from network element to network element either alone or combined with one or more other sub-rate streams. Thus, one or more embodiments of the present invention can be flexibly implemented to handle the transmission of sub-rate data streams from any source and to any destination in the network, thereby creating a flexible sub-rate data switching system.

Figure 3:
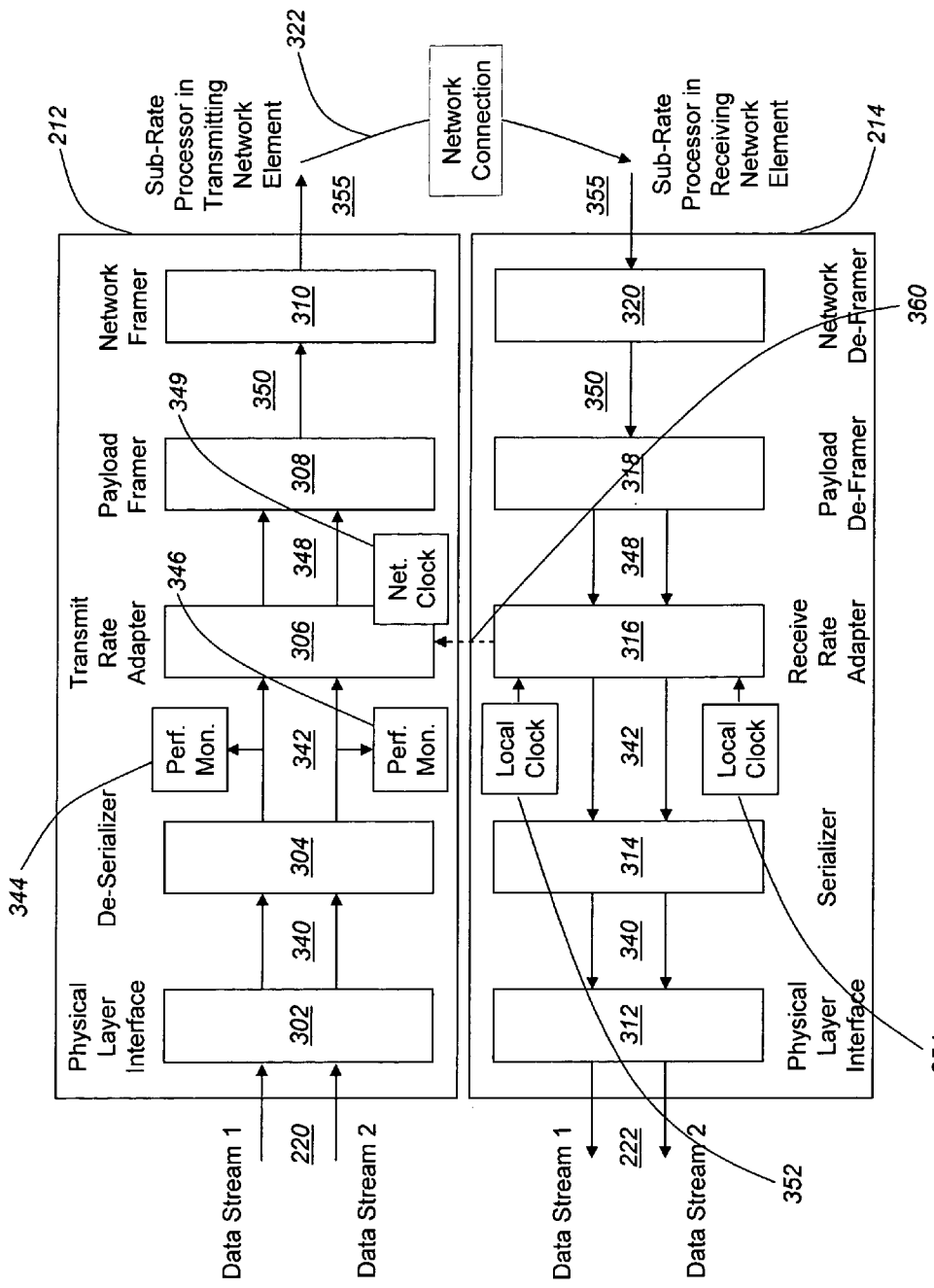
FIG. 3 shows a detailed diagram of the sub-rate data protocol processor shown in FIG. 2.

FIG. 3 shows detailed diagrams of the sub-rate protocol processors 212 and 214 of FIG. 2. In accordance with the invention, the sub-rate protocol processors may be implemented in many configurations. For example, the sub-rate protocol processors may be implemented in software, hardware, or a combination of both. The hardware may comprise logic, hardware processors, central processing units (CPU), programmable gate arrays (FPGA) or any other type of hardware circuit or system. The software may comprise software in the form of low-level drivers provided in machine code or assemble language, or high-level software provided in a high level programming language, such as C++. However, virtually any software compatible with the selected hardware may be used in accordance with the present invention.

The sub-rate protocol processor 212 includes an input physical layer interface 302, a de-serializer 304, a transmit rate adapter 306, a payload framer 308 and a network framer 310. The sub-rate protocol processor 214 includes an output physical layer interface 312, a serializer 314, a receive rate adapter 316, a payload de-framer 318 and a network de-framer 320. For the purposes of this description, it will be assumed that the sub-rate protocol processor 212 outputs data over network connection 322 for receipt by the sub-rate protocol processor 214. The network connection 322 is a communication path available within the network fabric 202 as described above.

Referring now to sub-rate protocol processor 212, the input physical layer interface 302 includes receive logic to receive the data streams 1 and 2 at tributaries 220. The received data streams may use virtually any protocol, such as the Internet Protocol (IP), the ESCON protocol, the GigE protocol, or the FC protocol. The receive logic receives the data streams via any type of input connection. For example, the data streams may be received via an optical single mode fiber connection, a multi-mode fiber connection, an electronic connection or wireless connection. The interface 302 receives the data streams 1 and 2 as serial data and buffers these data streams to produce buffered serial streams 340. In the described embodiment, it will be assumed that the received data streams 1 and 2 are provided by a source external to the sub-rate protocol processor 212. In other embodiments, described in other sections of this document, one or more received sub-rate data streams are received directly from the network itself, in one case, as a result of sub-rate data stream switching function.

The de-serializer 304 receives the buffered serial data streams 340 and forms parallel data streams 342 that are coupled to the transmit rate adapter 306. The de-serializer 304 includes a clock and data recover (CDR) circuit (not shown) that recovers a clock signal associated with each data stream. The de-serializer 304 may optionally include compressor and/or encoder logic (not shown) that compresses and/or encodes the buffered serial data stream 340 to form the parallel data streams 342 having a selected bit width. For example, if the buffered serial streams 340 contain data having a bit width of ten bits, the compressor/encoder logic compresses this data to parallel data having, for example, eight bits of data and one control bit for a bit-width of nine bits. The compressor/encoder logic may use any type of compression or encoding method to compress the bit width of the buffered serial data 340 to any desired bit width, and/or add parity bits or other fault detection/correction bits.

Performance monitors 344, 346 measure a quality indicator relative to the parallel data streams 342 they are monitoring. This provides a way for the quality of a data stream to be monitored before transmission over the communication network. Although not necessary, the performance monitoring may be protocol dependent, so that given a specific received data protocol; a particular performance monitor can be used to monitor that particular stream. For example, the throughput, packet type, packet number or any other protocol or data characteristic can be monitored.

The transmit rate adapter 306 receives the parallel data streams and inputs these streams into first-in-first-out (FIFO) registers (not shown) that are used to adjust timing differences between the clock associated with a particular received parallel sub-rate data stream and the clock associated with the network transmission protocol. As a result, rate-adapted data 348 is generated. For example, the received data stream may utilize the ESCON protocol having a data rate of 200 megabits per second and the network may be a SONET network that transmits data at 2.5 gigabits per second. In this case, the transmit rate adapter 306 operates to load and unload the FIFO registers to adjust the received data stream to the transmit rate of the SONET network as indicated by clock 349. In doing so, the shape of the received data stream is maintained and by minimizing the FIFO depth, data latency can be minimized. Additionally, stuffing opportunities can occur where the system removes additional data from the FIFOs for transmission based on FIFO fill levels and rate adaptation information. A more detailed discussion of stuffing opportunities is provided in another section of this document.

The payload framer 308 operates to receive rate-adapted data streams 348 and to frame these streams into a payload 350 for transmission over the network. For example, if the communication network is using a SONET protocol, then the data streams are framed into a SONET payload in accordance with the present invention. In addition, the payload framer 308 may include additional information within the created payload. Below is a partial list of information that may be included in the payload by the payload framer 308 for transmission over the network.

1. Framing information to recognize the start of the frame.
2. CRC information to ensure frame validity and prevent corruption.
3. Stuffing opportunity data for rate adaptation.
4. Status information regarding the remote node (transmitter).
5. Signaling channel built into frame to send signaling messages.

The network framer 310 receives the payload 350 created by the payload framer 306 and incorporates it into a network transmission frame 355 that is transmitted over the network link 322. For example, if the network transmits data using a SONET protocol, then the network framer 310 is a SONET framer that receives the payload 350 created by the payload framer 308 and incorporates the received payload into a SONET frame for transmission over the communication network. In one or more embodiments of the invention, any type of SONET framer is suitable for use as the network framer 310, since there is no data interpretation and the payload received for transmission is already in a format suitable for incorporation into a SONET frame. Furthermore, any upgrades to the network framer 310 will be fully compatible since the role of the network framer 310 is to simply incorporate the payload 350 created by the payload framer 308 into a network frame for transmission over the network. For example, the network frame is transmitted over the network link 322 from the transmitting network element 204 to the receiving network element 208. Furthermore, the network framer 310 can be any type of network framer that allows a data payload to be transmitted over a communication network. Thus, the invention is not limited to use with any particular network protocol. In fact, one or more embodiments of the invention are suitable for use with virtually any network protocol. Thus, the network framer 310 is used to implement the selected network protocol.

Once the network frame 355 is received at the receiving sub-rate protocol processor 214, it is input to the network de-framer 320. The network de-framer 320 removes the payload 350 from the network frame and outputs the payload to the payload de-framer 318.

The payload de-framer 318 de-frames the payload, to remove control and status information, and de-frames the rate-adapted data 348 for input to the receive rate adapter 316.

The receive rate adapter 316 includes receive FIFOs (not shown) that are used to receive the rate-adapted data streams 348. The receive FIFOs are used to adjust the rate of the rate-adapted data streams using local clock signals and to minimized data latency. For example, the rate-adapted data streams 348 are rate adjusted using the FIFOs and local clocks 352, 354 so that the data streams have the same timing as when received at the transmitting network element. The resulting parallel data streams 342 are input to the serializer 314.

The serializer 314 operates to expand and/or decode the parallel data streams 342, if necessary, and to serialize the data. For example, the de-serializer 304 may have compressed or encoded the data streams before transmission over the network. In one embodiment of the invention, data streams are received at the transmitting sub-rate protocol processor 212 having a bit width of ten bits and are compressed to have a bit width of nine bits before transmission. In this case, the serializer 314 operates to uncompress the data to restore the bit width of the data back to ten bits. The serializer 314 serializes the data so that the parallel data streams 342 received from the receive rate adapter 316 are converted to the serial data streams 340. As a result, the serial data streams 340 at the receiving network element have the same timing, shape and jitter pattern as when these data streams were received at the transmitting network element.

The physical layer interface 312 receives the serial data streams 340 from the serializer 314 and provides buffered output data streams at shown at output tributaries 222. As a result, users at the receiving sub-rate protocol processor 214 receive the data streams 1 and 2 having the identical data shape and protocol as when the streams were received at the transmitting sub-rate protocol processor 212. Although described with reference to transporting two sub-rate data streams, in one or more embodiments of the invention, it is possible to transport one or more sub-rate data streams so long as the effective data rate of the streams can be supported by the transmission rate of the communication network.

Figure 4:
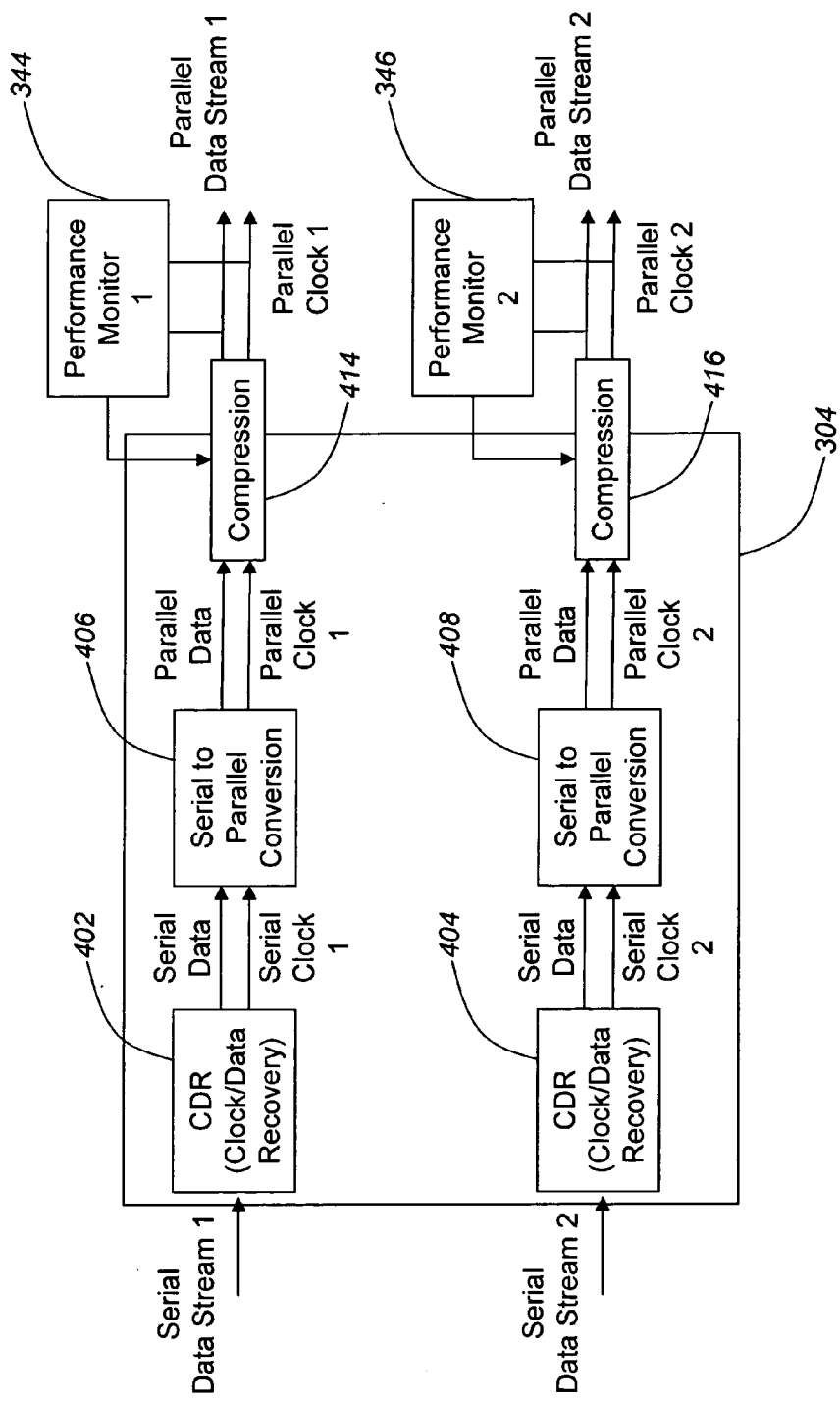
FIG. 4 shows one embodiment of a de-serializer constructed in accordance with the present invention.

FIG. 4 shows a detailed block diagram of the de-serializer 304 constructed in accordance with the present invention. The de-serializer 304 receives the two serial data streams (1 and 2), however, the de-serializer 304 may be adapted to receive any number of sub-rate data streams according to the number of streams that are to be framed for transmission over the communication network.

The de-serializer 304 includes CDR logic 402, 404 that separates data and clock for each received data stream. It is possible to use any type of CDR logic to perform this function. The de-serializer 304 also includes serial to parallel conversion logic 406, 408 that convert the received serial data streams (1 and 2) into parallel data streams, respectively. The parallel data streams have associated parallel clocks and both the parallel data and clocks are input to optional compression logic 414 and 416, respectively. The compression logic, if used, is operable to compress the parallel data to form parallel output streams 1 and 2. For example, the parallel data may be ten bits wide and the compression logic may operated to compress this ten-bit wide data to form parallel output streams that are nine bits wide. In one embodiment, the compression logic 414, 416 is optional so that no compression is performed on the parallel data streams. Although described as compression logic, it is possible to use any type of compression or encoding method to operate on the parallel data to form the parallel output streams 1 and 2 that have compressed data and/or special encoding, for example, added parity bits.

Optional performance monitors 344, 346 monitor the parallel output streams for quality. For example, the performance monitors detect whether errors from the compression process have occurred and provide performance indicators 422, 424 as feedback to the compression logic. The performance monitors may also monitor other characteristics of the parallel output streams. For example, the performance monitors may be protocol dependent, so that given a specific received data protocol; a particular performance monitor can be used to monitor that particular stream. For example, the performance monitors 344, 346 can monitor throughput, packet type, packet number or any other protocol or data characteristic. The parallel output streams (1 and 2) and associated clocks are then output to the transmit rate adapter 306.

Figure 5:
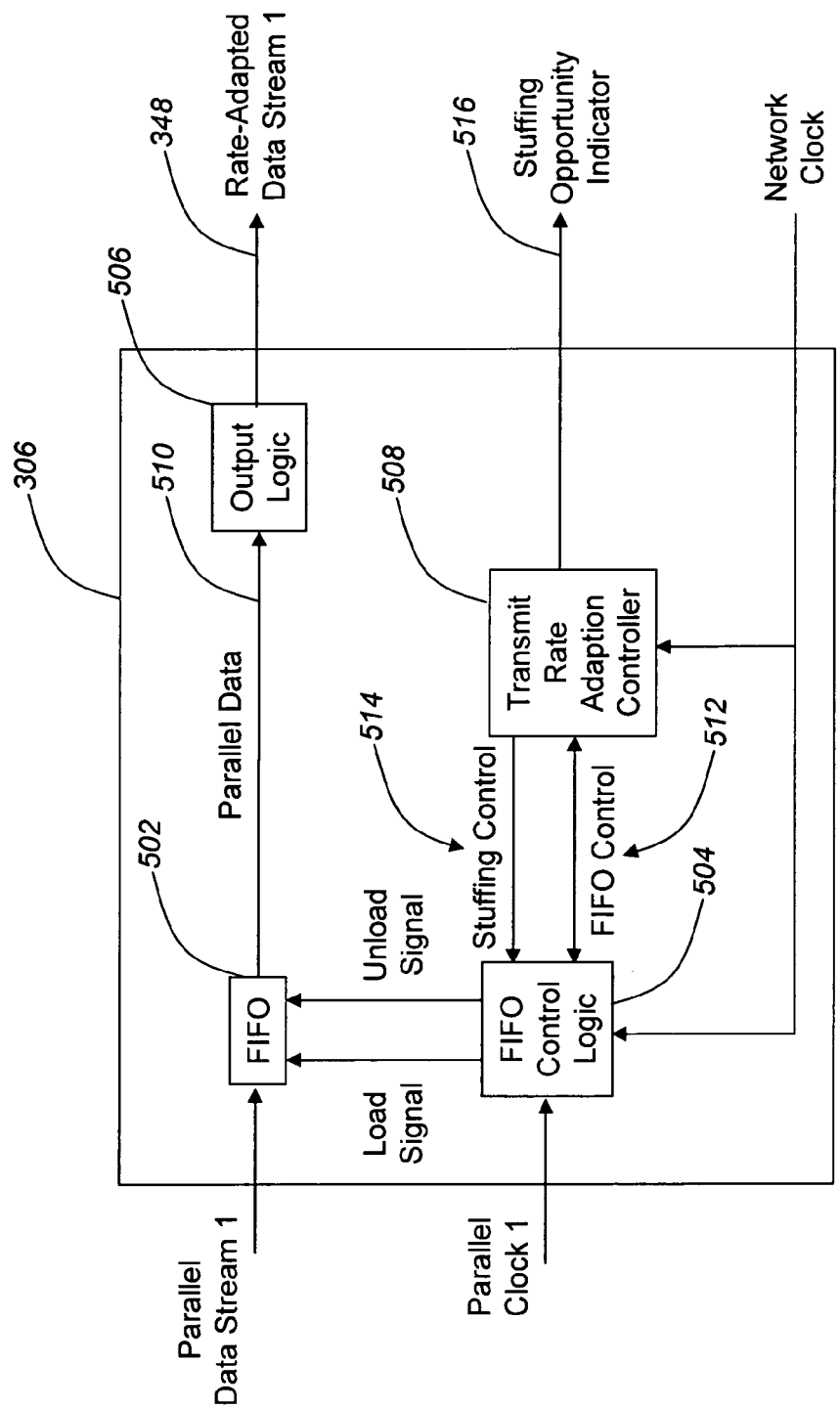
FIG. 5 shows one embodiment of a transmit rate adapter constructed in accordance with the present invention.

FIG. 5 shows a detailed diagram of a portion of the transmit rate adapter 306 constructed in accordance with the present invention. Since the rate adapter 306 performs a similar process on all the parallel data streams received from the de-serializer 304, a description of only a portion of the rate adapter 306 is provided for clarity purposes to describe the processing of one parallel data stream.

The transmit rate adapter 306 receives parallel data streams (for example, stream 1 and its associated parallel clock) from the de-serializer 304 and produces a rate-adapted stream 348 in accordance with the present invention. Since this process can be extended to all parallel streams received from the de-serializer 304, only the processing of one stream is described in detail.

The transmit rate adapter 306 includes FIFO 502, FIFO control logic 504, output logic 506 and a transmit rate adaptation controller 508. The FIFO 502 receives the parallel data stream 1 from the de-serializer 304 and stores the data in its internal registers. The FIFO control logic 504 receives the parallel clock 1 and a network clock that is representative of the network transmission rate based on the network protocol in use. The FIFO control logic produces a load signal that loads the parallel data stream into the FIFO 502. The FIFO control logic also produces an unload signal that unloads the parallel data from the FIFO 502 via a FIFO output 510. The FIFO control logic 504 produces the load and unload signals under the control of the transmit rate adaptation controller 508. The rate adaptation controller 508 provides FIFO control signals to the FIFO control logic 504 via control line 512.

The output logic 506 receives rate adapted stream data from the FIFO 502 and outputs the rate-adapted data stream as shown at 348. The controller 508 controls the flow of data from the FIFO to the output logic 506 and can insert stuffing opportunity data into the rate-adapted stream data. Stuffing opportunity data is additional parallel data read from the FIFO and inserted into the rate-adapted data stream based on FIFO fill levels. By inserting stuffing opportunity data, the rate adapter adapts the rate of the received parallel data stream to the network rate by maintaining the fill level in the FIFO 502 at a selected level.

In one embodiment, the controller 508 provides a stuffing opportunity control signal 514 to the FIFO control logic to indicate that additional parallel data is to be unloaded from the FIFO to the output logic. In addition, the controller 508 provides a stuffing opportunity indicator 516 to the payload framer 308 to indicate this condition. The stuffing opportunity is based on the fill level of the FIFO 502. If the FIFO 502 begins to overflow or exceed a selected data fill level, then additional data will be removed from the FIFO and sent out as stuffing opportunity data, thereby allowing the adaptation controller 508 to control the fill level of the FIFO 502. Thus, the rate adaptation controller 508 performs rate adaptation by controlling the fill level of the FIFO 502.

Figure 6:
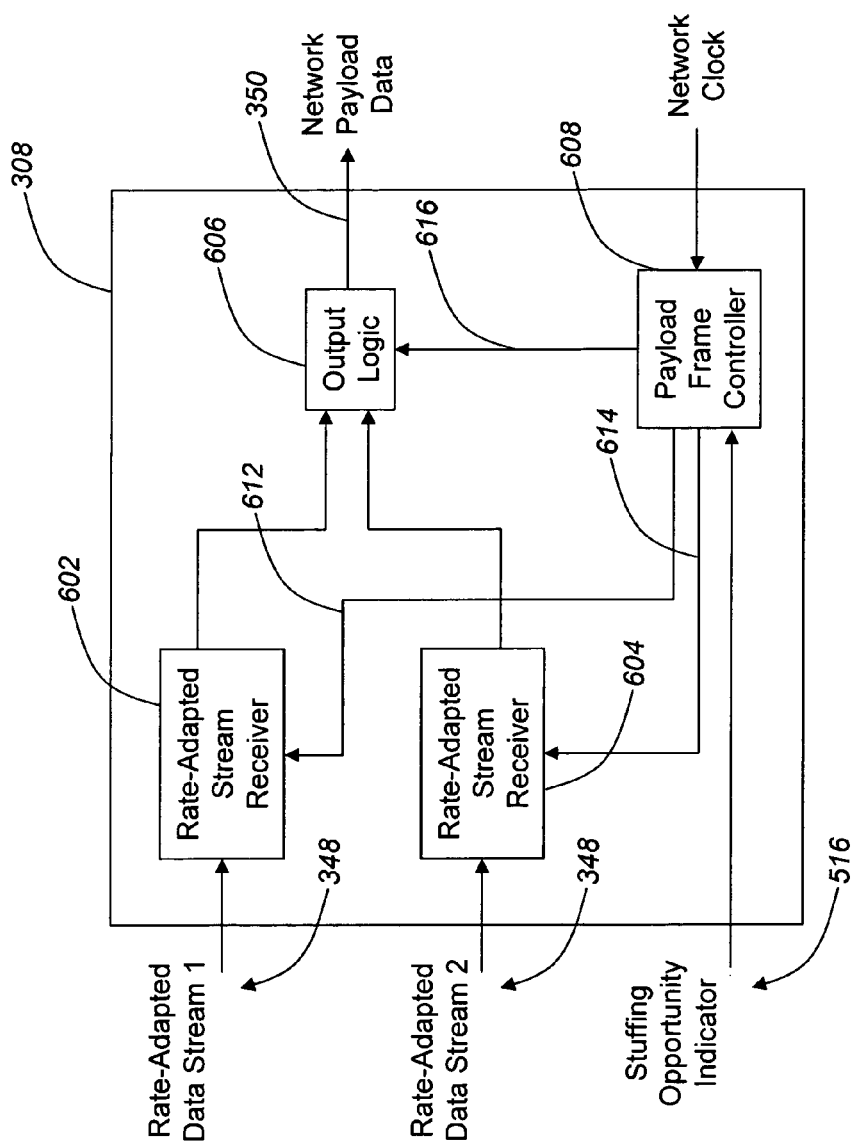
FIG. 6 shows one embodiment of a payload framer constructed in accordance with the present invention.

FIG. 6 shows a detailed diagram of one embodiment of the payload framer 308 constructed in accordance with the present invention. The payload framer 308 includes stream receivers 602, 604, output logic 606 and payload frame controller 608. The receivers 602, 604 receive rate-adapted stream data from the transmit rate adapter 306. For example, the framer 308 is shown receiving rate-adapted stream data for streams 1 and 2 that have been generated by the transmit rate adapter 306. The framer 308 receives the rate-adapted streams and frames them into the network payload 350 for transmission over the communication network. Although only two rate-adapted streams are shown, it is possible that the framer 308 receives more or less rate-adapted streams to frame depending upon how many streams are to be framed into the network payload.

The receivers 602 and 604 are coupled to the output logic 606 so that received rate-adapted stream data may be used to form the network payload data 350 that is produced by the output logic 606. The frame controller 608 controls the operation of the receivers via control lines 612, 614. The frame controller 608 uses the control lines 612, 614 to control the flow of data from the receivers 602, 604 to the output logic 606. The frame controller 608 is also coupled to the output logic 606 and can provide control or other information to the output logic via control line 616. For example, the frame controller 608 controls how the network payload data is formed from the received stream data and can insert control, status or other information into the payload.

The frame controller 608 also receives the stuffing opportunity indicator 516 that indicates that additional data has been added to one or both of the rate adapted streams to adjust FIFO fill levels. The frame controller uses the indicator 516 to place the additional stuffing data into the payload 350.

In one embodiment, the frame controller allows selected data from each stream receiver to be output as part of the network payload data 350. In this fashion, the frame controller determines how the received rate-adapted stream data forms the network payload. Included in this process is the ability of the frame controller to insert various control and frame data into the network payload. For example, the frame controller may insert header data at the beginning of the network payload followed by the received rate-adapted stream data mapped into selected locations of the network payload. The stuffing data, if any, is also placed into the payload. Thus, the framer 308 is operable to create virtually any kind of network payload from the received rate-adapted stream data. A more detailed description of the network payload is provided in another section of this document.

Figure 7:
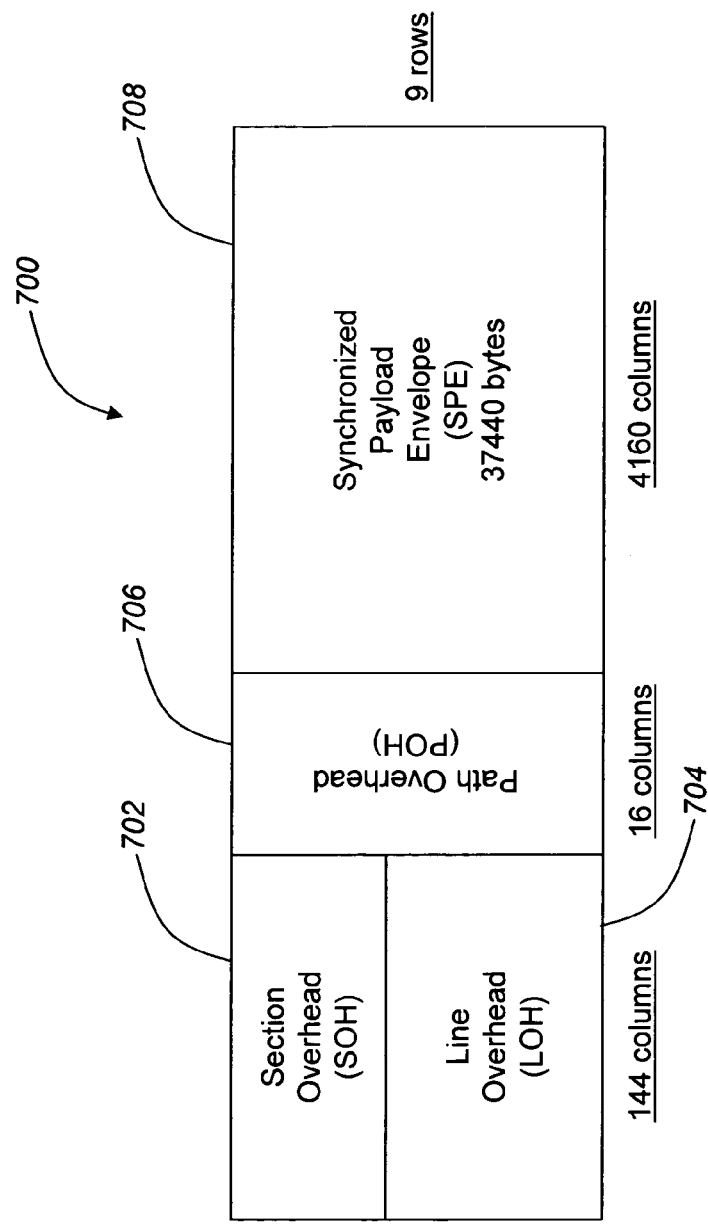
FIG. 7 shows a diagram of typical SONET frame.

FIG. 7 shows a diagram of a typical SONET data frame 700 for transmission over a communication network that uses the SONET protocol, for example, the OC-48 protocol. The data frame comprises data bytes arranged as 9 rows by 4320 columns. The data frame 700 includes section overhead data 702, line overhead data 704 and path overhead data 706. The frame 700 also includes a synchronized payload envelope (SPE) 708 that is used to transport payload data. For example, data representing voice or streaming media content can be transported over the network using a sequence of the SONET frame 700 where the SPE contains the voice or media content to be transported. In one or more embodiments of the present invention, multiple sub-rate data steams are transparently framed into the SPE for transmission over a communication network.

Figure 8:
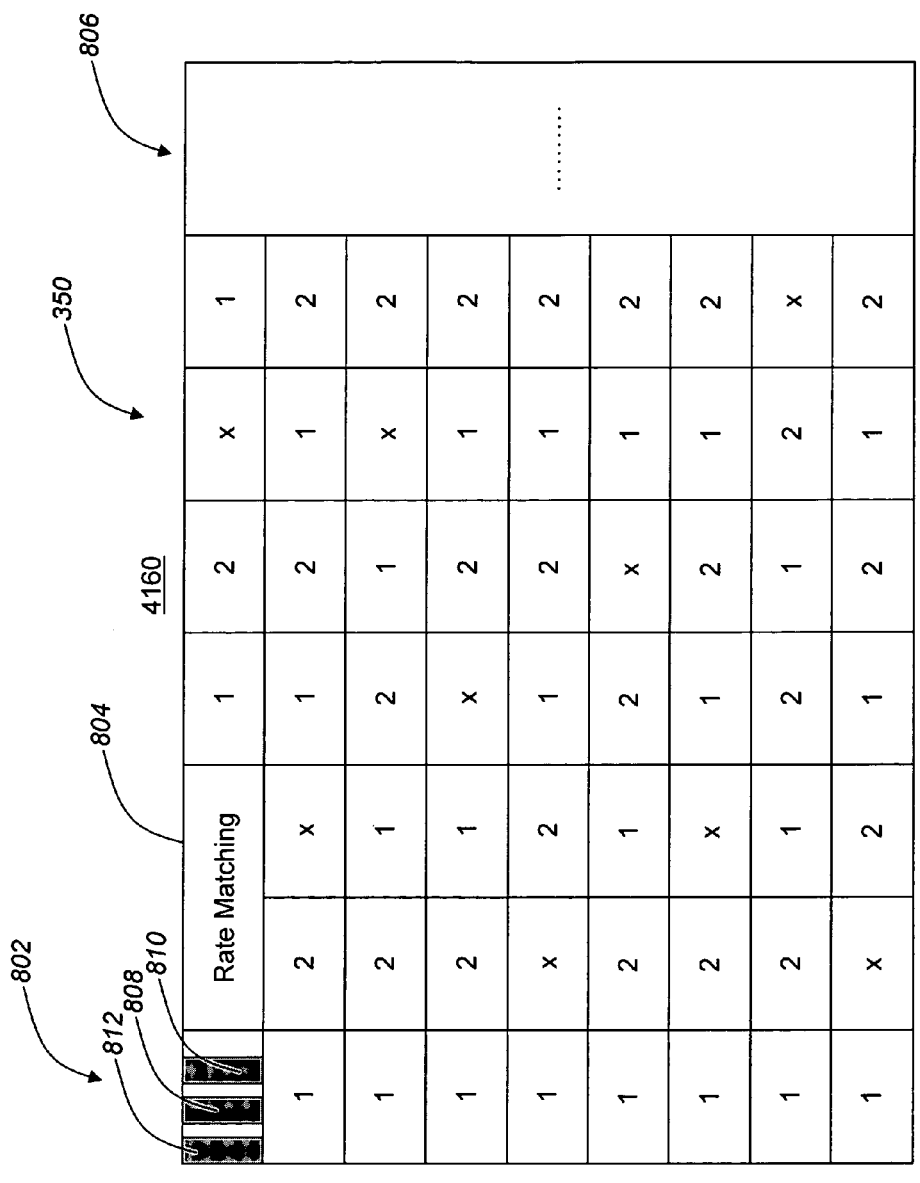
FIG. 8 shows one embodiment of a data payload constructed in accordance with the present invention.

FIG. 8 shows an exemplary representation of network payload 350 created by the payload framer 308 for insertion into the SPE of the typical SONET frame 700 of FIG. 7. The payload 350 includes a status and control portion 802, a rate matching portion 804, and the remaining data is payload data 806. The rate matching portion 804 is similar to the data payload 806 and includes additional rate-adapted data to be carried over the frame. The payload data 806 represents the rate-adapted stream data received by the framer 308. For example, in the payload 350, stream 1 data and stream 2 data are alternately used to fill the payload data 806 portion. Occasionally, portions of the payload are unused as shown in FIG. 8.

The payload framer 308 creates the network payload 350 by first inserting the status and control portion 802 and the rate matching portion 804 into the payload 350. This is accomplished, for example, by the frame controller 608 using control line 616 to input this information to the output logic 606 for inclusion into the payload data 350. Next, the stream data 1 and 2 are alternately inserted into the payload data 350. This is accomplished, for example, by the frame controller 608 using control lines 612 and 614 to alternately control the receivers 602 and 604 to transmit their associated stream data to the output logic 606 for inclusion into the payload data 350. Thus, the operation of the framer controller 608 results in the formation of the exemplary network payload 350 shown in FIG. 8.

The status and control information 802 includes a frame marker 812, stuffing control data 808, and stuffing data 810. The frame marker 812 indicates the start of a frame. The stuffing control data 808 is used to provide information about how much stuffing data is present in the frame. For example, the stuffing control data 808 may comprise two bytes of data that indicate how many bytes of stuffing data are included in the frame. The stuffing data 810 comprises stream data that is in addition to the stream data that is loaded into the payload data 806. The stuffing data is used to maintain a selected fill level of the FIFO 502 to provide rate adaptation as described above. During operation of the payload framer 308, a determination is made when forming each payload 350 to determine how much stuffing data will be included in the frame. The stuffing data needed to adjust the FIFO to a selected level is then placed in the status and control information 802 as described above.

In the above-described operation, the rate-adapted streams (1 and 2) are alternately inserted into the payload data portion 806. However, in other embodiments of the present invention, the stream data is not alternately inserted, but instead, it is inserted at selected ratios. The ratios are selected based on the protocol and data rate of the received sub-rate streams and the network protocol used for transmitting the network payload 350 over the communication network. For example, if the network is a SONET network using the OC-48 protocol, data is transmitted over the network at approximately 2.5 gigabits per second and the insertion of the rate-adapted stream data into the network payload depends on the data rates of the sub-rate streams. If there are two received sub-rate streams to be transmitted, and one of those sub-rate streams utilizes the GigE protocol and the other sub-rate stream utilizes the FC protocol, the GigE sub-rate stream has a data rate of approximately 1.0 gigabits per second and the FC sub-rate stream has a data rate of approximately, 0.2 gigabits per second. Therefore, to transmit the two sub-rate streams requires a bandwidth of approximately 1.2 gigabits per second, which is well within the available bandwidth of the OC-48 protocol (i.e., 2.5 gigabits per second). Furthermore, the sub-rate stream data will be framed into network payload 350 at a rate of five to one. That is to say, five bytes of rate-adapted GigE protocol stream data will be framed into the network payload 350 for every one byte of the rate-adapted FC protocol stream data.

By applying the above described technique to other sub-rate protocols, it is possible to determine what sub-rate stream combinations can be framed into a given network payload and at what ratio. This provides a robust approach for transmitting sub-rate streams since it is not necessary to interpret the sub-rate data of different protocols. Furthermore, the system includes the ability to compress or encode the sub-rate data so that, for example, even accounting for some additional overhead, two GigE sub-rate streams can be framed into an OC-48c data payload. The system's compressing capability includes quality checks to detect errors and also allows control and signaling information to be framed into the network payload for transmission with the sub-rate data.

Once the SPE of the network frame is loaded with the payload data 350, the frame is transmitted over the network via the network transmission path shown at 322. The transmitted sub-rate data is received by the receiving network element. The receiving network element includes the sub-rate protocol processor 214 that reverses the process performed by the sub-rate protocol processor 212 to de-frame the sub-rate data from the network payload. The sub-rate protocol processor 214 restores the sub-rate data to their original protocol, so that the data has the same protocol and maintains the same shape, jitter and other signal characteristics as when received at the protocol processor 212.

Figure 9:
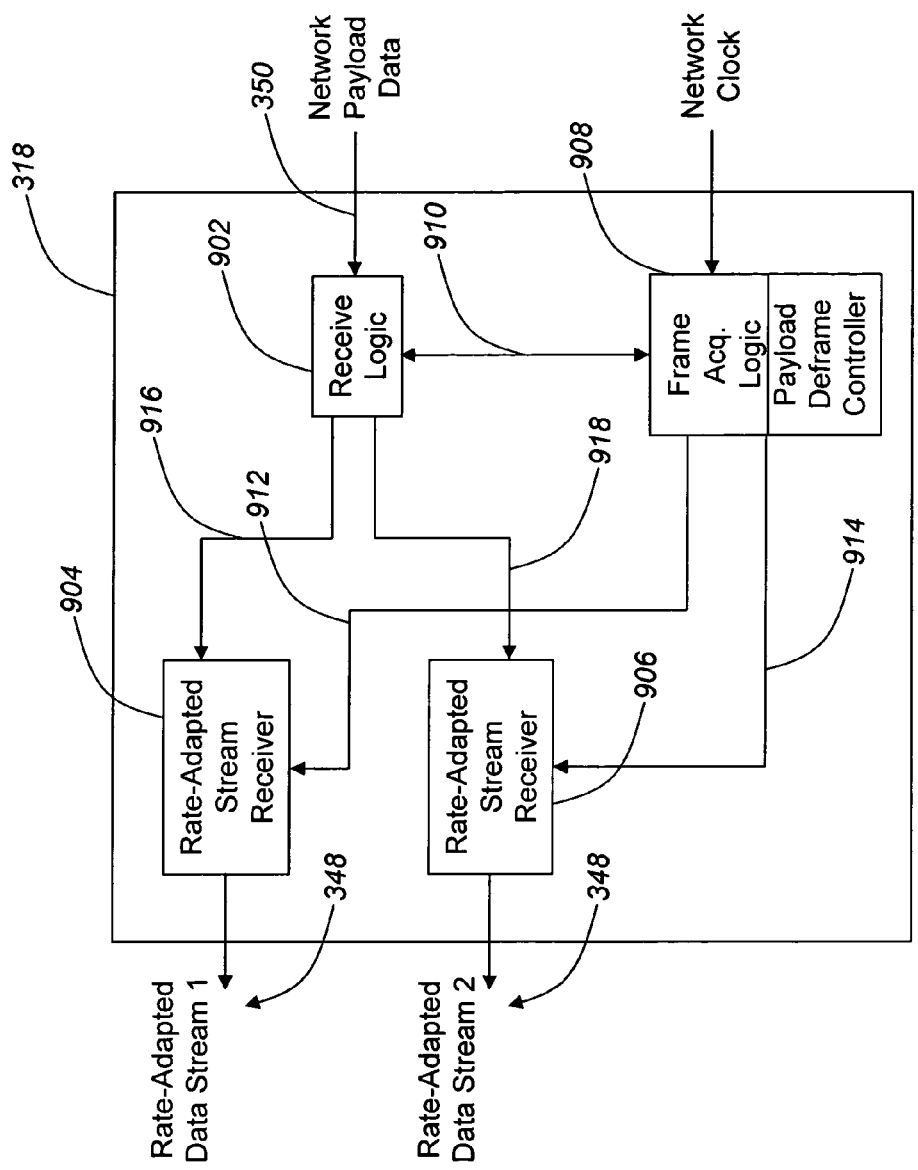
FIG. 9 shows one embodiment of a payload de-framer constructed in accordance with the present invention.

FIG. 9 shows one embodiment of the payload de-framer 318 constructed in accordance with the present invention. For the following description, it will be assumed that the sub-rate data streams 1 and 2 were framed into a network transmission by sub-rate protocol processor 212. The network transmission was via the network connection 322 to sub-rate protocol processor 214, where the network de-framer 320 removed the payload 350 and provided this payload to the payload de-framer 318.

The payload de-framer includes receive logic 902, rate adapted stream transmitters 904, 906, and a payload de-framer 908. The receive logic 902 receives the payload 350 from the network de-framer 320. The payload de-framer 908 provides control information to the receive logic 902, via line 910, to control how the sub-rate data streams are unpacked from the payload 350.

The payload de-framer 908 includes frame acquisition logic to determine the start of a payload frame in the received payload 350. The payload controller 908 is also coupled to the stream transmitters 904, 906 via control lines 912 and 914, so that the controller 908 can control how sub-rate data streams output from the receive logic 902 on lines 916, 918 are processed by the transmitters 904, 906. Thus, once the start of a frame is detected, the payload de-framer operates to de-frame the received payload 350 to produce rate adapted sub-rate streams 348.

Figure 10:
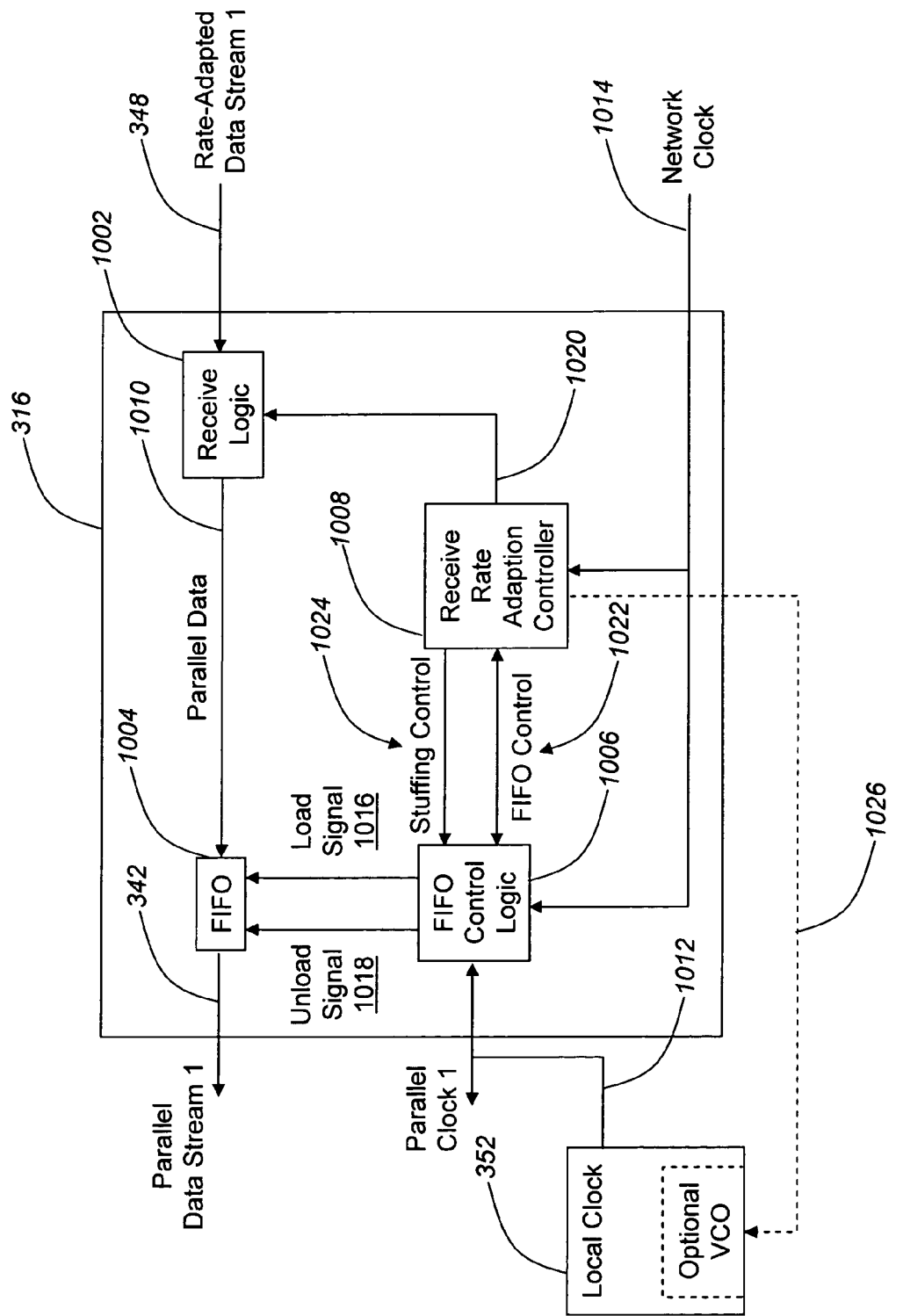
FIG. 10 shows one embodiment of a receive rate adapter constructed in accordance with the present invention.

FIG. 10 shows one embodiment of a receive rate adapter 316 constructed in accordance with the present invention. For the purposes of clarity, only a portion of the receive rate adapter 316 is shown to demonstrate the processing of one sub-rate data stream (348) received from the payload de-framer 318. Additional sub-rate data streams may be processed in a similar fashion.

The receive rate adapter 316 includes receive logic 1002, FIFO 1004, FIFO control logic 1006 and receive rate adaptation controller 1008. The receive logic 1002 receives the rate adapted data stream 348 from the payload de-framer 318 and provides parallel data to the FIFO 1004 via path 1010. The FIFO control logic 1006 receives clock input 1012 from the local clock source 352 and a network clock 1014 to produce a load signal 1016 and an unload signal 1018 to the FIFO 1004. The FIFO unloads the parallel data 342 at a rate that corresponds to the initial protocol of the sub-rate data stream. The receive rate adaptation controller 1008 provides control to the receive logic 1002, via control line 1020, and to the FIFO control logic 1006, via control line 1022. Additionally, the controller 1008 provides a stuffing control line 1024 to the FIFO control logic 1006 so that any stuffing opportunity data may also be output from the FIFO 1004. Thus, the receive rate adapter 316 operates to receive parallel rate-adapted sub-rate data streams (i.e., stream 348) to produce parallel sub-rate data streams (i.e., stream 342) that have timing that corresponds to the protocol associated with the sub-rate data stream.

In one embodiment, the local clock 352 includes an optional voltage controlled oscillator (VCO) to generate the clock input 1012 to the FIFO control logic 1006. The frequency of the VCO is set by a VCO control signal 1026 that is output from the adaptation controller 1008. This arrangement allows the clock input 1012 to be derived from network parameters (i.e., a recovered clock) under the control of the adaptation controller 1008, thereby providing added flexibility allowing the rate adapter 316 to handle virtually any sub-rate protocol whether or not packet based.

Figure 11:
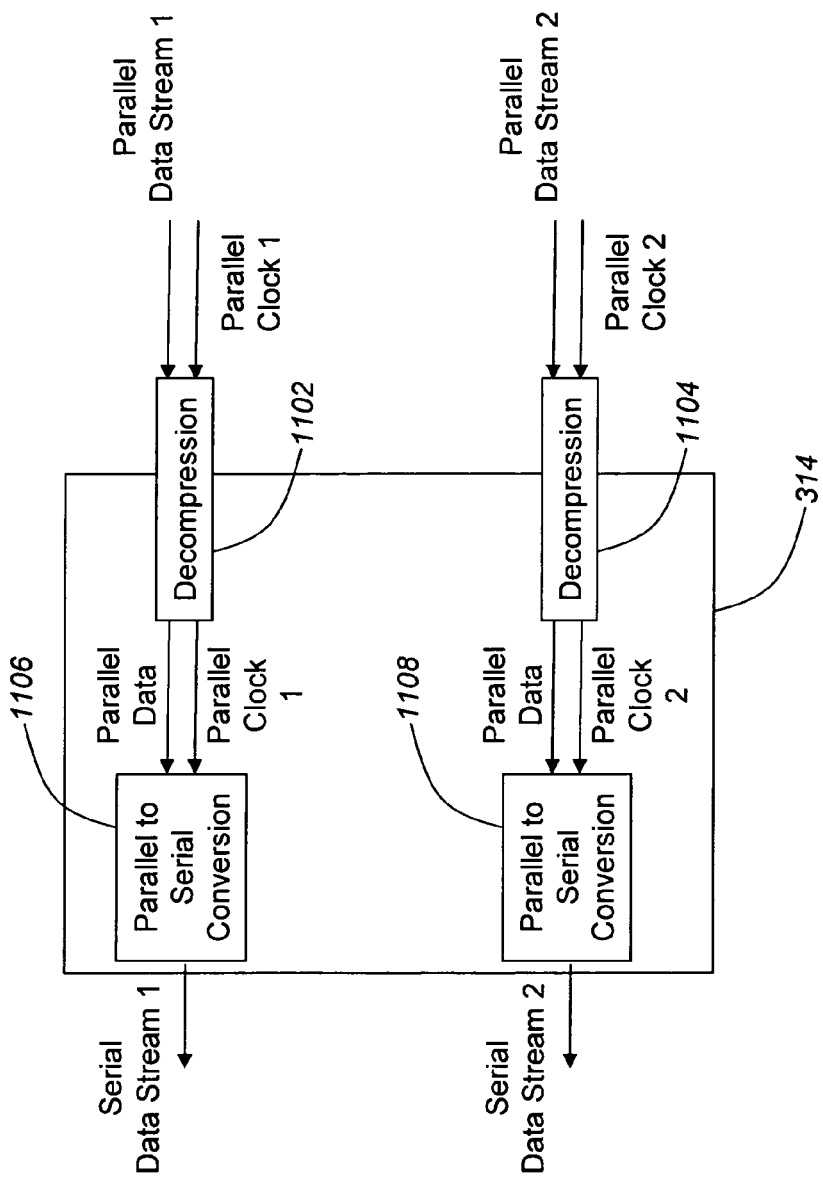
FIG. 11 shows one embodiment of a serializer constructed in accordance with the present invention.

FIG. 11 shows one embodiment of the serializer 314 constructed in accordance with the present invention. The serializer 314 includes optional decompression logic 1102, 1104, and parallel to serial conversion logic 1106, 1108. The serializer 314 operates to receive parallel sub-rate data streams from the receive rate adapter 316 and to convert these parallel streams to serial data streams. The optional decompression logic 1102, 1104 provides for decompressing the parallel streams if they were previously compressed or encoded by the de-serializer 304. The parallel to serial conversion logic 1106, 1108 converts the parallel data streams to serial data streams 340 that are input to the physical layer interface 312.

Thus, the parallel data streams are converted to serial data and output at the receive sub-rate protocol processor 214 via the output tributaries 222 associated with the physical layer interface 312. As a result, the above described system is able to receive sub-rate data streams having associated protocols and transparently frame these streams into a network payload for transmission over a communication network without having to interpret the data in the sub-rate streams. At the receiving end, the network payload is de-framed and the sub-rate data streams are restored in their original protocols. The streams are then available to be used at the receiving network location.

In one embodiment, the system can effectively switch sub-rate data from network element to network element, since sub-rate data can be selectively added or dropped from the high-speed network data stream at any selected network element. Referring again to FIG. 3 therein is shown the sub-rate protocol processors 212 and 214. To implement the sub-rate switching function, sub-rate data received from the network at the protocol processor 214 is de-framed at the payload de-framer 318 and rate adapted by the receive rate adapter 316. The resulting rate-adapted sub-rate data is then input, via path 360, to the transmit rate adapter 306, where it is rate adapted again for input to the payload framer 308. At this point, the sub-rate data may be framed with other sub-rate data for transmission over the communication network. For example, a sub-rate stream received from the communication network may go through the above processing to be framed with another sub-rate stream that was received from a source external to the network element. Thus, it is possible to de-frame and re-frame sub-rate data from network element to network element to effectuate a sub-rate data switching function.

The present invention includes a system for transporting a plurality of sub-rate data streams over a communication network using a selected network protocol. The embodiments described above are illustrative of the present invention and are not intended to limit the scope of the invention to the particular embodiments described. Accordingly, while one or more embodiments of the invention have been illustrated and described, it will be appreciated that various changes can be made therein without departing from the spirit or essential characteristics thereof. Accordingly, the disclosures and descriptions herein are intended to be illustrative, but not limiting, of the scope of the invention, which is set forth in the following claims.

What is claimed is:

1. An apparatus for transmitting a sub-rate data stream over a communication network that uses a selected network protocol, wherein the sub-rate data stream has an associated sub-rate protocol, the apparatus comprising:

a rate adapter coupled to receive an uninterpreted sub-rate data stream and operable to, without interpretation, adapt a rate characteristic associated with a sub-rate protocol to a rate characteristic associated with a selected network protocol to generate an uninterpreted rate-adapted data stream from the uninterpreted sub-rate data stream, wherein the rate adapter comprises logic to determine a stuffing opportunity that indicates an amount of stuffing data of the uninterpreted rate-adapted data stream to be framed in a payload, wherein the amount of stuffing data is responsive to the uninterpreted sub-rate data stream; and a payload framer coupled to receive the uninterpreted rate-adapted data stream and operable to frame the uninterpreted rate-adapted data stream into a payload for transmission over a communication network using the selected network protocol;

wherein the sub-rate data stream has an effective data rate equal to or less than a data rate associated with the selected network protocol.

2. The apparatus of claim 1, further comprising a de-serializer having logic to receive a serial version of the sub-rate data stream and form the sub-rate data stream.

3. The apparatus of claim 2, wherein the de-serializer includes a clock recovery circuit that recovers a sub-rate clock associated with the sub-rate data stream, and wherein the sub-rate clock is coupled to the rate adapter.

4. The apparatus of claim 2, wherein the de-serializer includes compression logic to compress the serial version of the sub-rate data stream to form the sub-rate data stream.

5. The apparatus of claim 1, wherein the rate adapter includes a first-in-first-out (FIFO) memory to provide storage for the sub-rate data stream.

6. The apparatus of claim 1, wherein the rate adapter generates a stuffing opportunity indicator that is coupled to the payload framer.

7. The apparatus of claim 6, wherein the payload framer includes logic to receive the stuffing opportunity indicator and frame the stuffing data into the payload based on the stuffing opportunity indicator.

8. The apparatus of claim 1, further comprising a network framer coupled to the payload framer and having logic to receive the payload, frame the payload into a network frame, and transmit the network frame over the communication network using the selected network protocol.

9. An apparatus for receiving a sub-rate data stream over a communication network that uses a selected network protocol, wherein the sub-rate data stream has an associated sub-rate protocol, the apparatus comprising:

a payload de-framer coupled to receive a payload transmitted over a communication network using a selected network protocol and to de-frame the payload into an uninterpreted rate-adapted data stream that is representative of an uninterpreted sub-rate data stream; and a rate adapter coupled to receive the uninterpreted rate-adapted data stream and operable to, without interpretation, adapt a rate characteristic associated with the selected network protocol to a rate characteristic associated with a sub-rate protocol to generate the uninterpreted sub-rate data stream from the uninterpreted rate-adapted data stream, wherein the rate adapter comprises logic to determine a stuffing opportunity that indicates an amount of stuffing data included in the uninterpreted rate-adapted data stream, wherein the amount of stuffing data is responsive to the uninterpreted sub-rate data stream, and logic to include the stuffing data in the uninterpreted sub-rate data stream;

wherein the sub-rate data stream has an effective data rate equal to or less than a data rate associated with the selected network protocol.

10. The apparatus of claim 9, further comprising a serializer coupled to the rate adapter and having logic to receive the sub-rate data and produce a serial version of the sub-rate data stream.

11. The apparatus of claim 10, wherein the serializer includes decompression logic to decompress the sub-rate data stream to form the serial version of the sub-rate data stream.

12. The apparatus of claim 9, further comprising clock logic that provides a local clock signal that is coupled to the rate adapter, wherein the local clock signal is associated with the sub-rate protocol.

13. The apparatus of claim 9, wherein the payload de-framer includes frame acquisition logic to detect a frame marker in the payload.

14. The apparatus of claim 9, further comprising a network de-framer coupled to the payload de-framer and having logic to receive a network frame transmitted over the communication network using the selected network protocol and de-frame the payload from the network frame.

15. A system for transporting a sub-rate data stream over a communication network that uses a selected network protocol, wherein the communication network includes a plurality of interconnected network elements, and wherein the sub-rate data stream has an associated sub-rate protocol, the system comprising:
  a transmit rate adapter located at a source network element that is coupled to receive an uninterpreted sub-rate data stream and operable to, without interpretation, adapt a rate characteristic associated with a sub-rate protocol to a rate characteristic associated with a selected network protocol to generate an uninterpreted rate-adapted data stream from the uninterpreted sub-rate data stream, wherein the transmit rate adapter comprises logic to determine a stuffing opportunity that indicates an amount of stuffing data of the uninterpreted rate-adapted data stream to be framed in a payload, wherein the amount of stuffing data is responsive to the uninterpreted sub-rate data stream;
  a payload framer located at the source network element that is coupled to receive the uninterpreted rate-adapted data stream and operable to frame the uninterpreted rate-adapted data stream into a payload that is transmitted over a communication network using the selected network protocol;
  a payload de-framer located at a destination network element that is coupled to receive the payload transmitted over the communication network using the selected network protocol and to de-frame the payload into the uninterpreted rate-adapted data stream that is representative of the uninterpreted sub-rate data stream; and
  a receive rate adapter located at the destination network element that is coupled to receive the uninterpreted rate-adapted data stream and operable to, without interpretation, adapt a rate characteristic associated with the selected network protocol to a rate characteristic associated with the sub-rate protocol to generate the uninterpreted sub-rate data stream from the uninterpreted rate-adapted data stream, wherein the receive rate adapter comprises logic to determine a stuffing opportunity that indicates an amount of stuffing data included in the uninterpreted rate-adapted data stream, wherein the amount of stuffing data is responsive to the uninterpreted sub-rate data stream and logic to include the stuffing data in the uninterpreted sub-rate data stream; wherein the sub-rate data stream has an effective data rate equal to or less than a data rate associated with the selected network protocol.

16. The system of claim 15, further comprising a de-serializer located at the source network element and having logic to receive a serial version of the sub-rate data stream and form the sub-rate data stream.

17. The system of claim 16, wherein the de-serializer includes a clock recovery circuit that recovers a sub-rate clock associated with the sub-rate data stream, and wherein the sub-rate clock is coupled to the transmit rate adapter.

18. The system of claim 16, wherein the de-serializer includes compression logic to compress the serial version of the sub-rate data stream to form the sub-rate data stream.

19. The system of claim 15, wherein the transmit rate adapter includes a first-in-first-out (FIFO) memory to provide storage for the sub-rate data stream.

20. The system of claim 15, wherein the transmit rate adapter includes logic that outputs a stuffing opportunity indicator to the payload framer.

21. The system of claim 20, wherein the payload framer includes logic to receive the stuffing opportunity indicator and frame the stuffing data into the payload based on the stuffing opportunity indicator.

22. The system of claim 15, further comprising a network framer coupled to the payload framer and having logic to receive the payload frame the payload into a network frame and transmit the network frame over the communication network using the selected network protocol.

23. The system of claim 15, further comprising a serializer located at the destination network element and coupled to the receive rate adapter and having logic to receive the sub-rate data stream and produce a serial version of the sub-rate data stream.

24. The system of claim 23, wherein the serializer includes decompression logic to decompress the sub-rate data stream to form the serial version of the sub-rate data stream.

25. The system of claim 15, wherein the receive rate adapter further comprises clock logic that provides a local clock signal that is coupled to the rate adapter, wherein the local clock signal is associated with the sub-rate protocol.

26. The system of claim 15, wherein the payload de-framer includes frame acquisition logic to detect a frame marker in the payload.

27. The system of claim 15, further comprising a network de-framer coupled to the payload de-framer and having logic to receive a network frame transmitted over the communication network using the selected network protocol and de-frame the payload from the network frame.

28. A method for transmitting a sub-rate data stream over a communication network that uses a selected network protocol, wherein the sub-rate data stream has an associated sub-rate protocol, the method comprising steps of:
  adapting a rate characteristic associated with an uninterpreted sub-rate protocol to a rate characteristic associated with a selected network protocol, without interpretation, to generate an uninterpreted rate-adapted data stream from the uninterpreted sub-rate data stream, wherein adapting the rate characteristic comprises determining a stuffing opportunity that indicates an amount of stuffing data associated with the uninterpreted rate-adapted data stream to be framed in a payload, wherein the amount of stuffing data is responsive to the uninterpreted sub-rate data stream; and framing the uninterpreted rate-adapted data stream into a payload for transmission over a communication network using the selected network protocol;

wherein the sub-rate data stream has an effective data rate equal to or less than a data rate associated with the selected network protocol.

29. The method of claim 28, further comprising a step of de-serializing a serial version of the sub-rate data stream to form the sub-rate data stream.

30. The method of claim 29, wherein the step of de-serializing includes a step of recovering a sub-rate clock associated with the sub-rate data stream.

31. The method of claim 29, wherein the step of de-serializing includes a step of compressing the serial version of the sub-rate data stream to form the sub-rate data stream.

32. The method of claim 28, wherein the step of adapting includes a step of storing the sub-rate data stream in a first-in-first-out (FIFO) memory.

33. The method of claim 28, further comprising a step of generating a stuffing opportunity indicator associated with the stuffing data.

34. The method of claim 33, wherein the step of framing includes a step of framing the stuffing data into the payload based on the stuffing opportunity indicator.

35. The method of claim 28, further comprising steps of:
framing the payload into a network frame; and
transmitting the network frame over the communication network using the selected network protocol.

36. A method for receiving a sub-rate data stream over a communication network that uses a selected network protocol, wherein the sub-rate data stream has an associated sub-rate protocol, the method comprising steps of:
de-framing a payload transmitted over a communication network using a selected network protocol into an uninterpreted rate-adapted data stream that is representative of an uninterpreted sub-rate data stream; and
adapting a rate characteristic associated with the selected network protocol to a rate characteristic associated with a sub-rate protocol, without interpretation, to generate the uninterpreted sub-rate data stream from the uninterpreted rate-adapted data stream, wherein adapting the rate characteristic includes determining a stuffing opportunity that indicates an amount of stuffing data included in the uninterpreted rate-adapted data stream, wherein the amount of stuffing data is responsive to the uninterpreted sub-rate data stream, and including the stuffing data in the uninterpreted sub-rate data stream;
wherein the sub-rate data stream has an effective data rate equal to or less than a data rate associated with the selected network protocol.

37. The method of claim 36, further comprising a step of serializing the sub-rate data stream to produce a serial version of the sub-rate data stream.

38. The method of claim 37, wherein the step of serializing further comprises a step of decompressing the sub-rate data stream to form the serial version of the sub-rate data stream.

39. The method of claim 36, wherein the step of adapting includes a step of generating a local clock signal that is associated with the selected network protocol.

40. The method of claim 36, wherein the step of de-framing includes a step of detecting a frame marker in the payload.

41. The method of claim 36, further comprising steps of:
receiving a network frame over the communication network using the selected network protocol; and
de-framing the payload from the network frame.

42. A method for transporting a sub-rate data stream over a communication network that uses a selected network protocol, wherein the sub-rate data stream has an associated sub-rate protocol, the method comprising steps of:
adapting a receive-rate characteristic associated with a sub-rate protocol to a transmit-rate characteristic associated with a selected network protocol, without interpretation, to generate an uninterpreted rate-adapted data stream from an uninterpreted sub-rate data stream, wherein adapting the receive-rate characteristic comprises determining a stuffing opportunity that indicates an amount of stuffing data associated with the uninterpreted rate-adapted data stream to be framed in a payload, wherein the amount of stuffing data is responsive to the uninterpreted sub-rate data stream;
framing the uninterpreted rate-adapted data stream into a payload that is transmitted over a communication network using the selected network protocol;
de-framing the payload transmitted over the communication network using the selected network protocol into the uninterpreted rate-adapted data stream that is representative of the uninterpreted sub-rate data stream; and
adapting the transmit-rate characteristic associated with the selected network protocol to the receive-rate characteristic associated with the sub-rate protocol, without interpretation, to generate the uninterpreted sub-rate data streams;
wherein the sub-rate data stream has an effective data rate equal to or less than a data rate associated with the selected network protocol.

43. The method of claim 42, further comprising a step of de-serializing a serial version of the sub-rate data stream to form the sub-rate data stream.

44. The method of claim 43, wherein the step of de-serializing includes a step of recovering a sub-rate clock associated with the sub-rate data stream.

45. The method of claim 43, wherein the step of de-serializing includes a step of compressing the serial version of the sub-rate data stream to form the sub-rate data stream.

46. The method of claim 42, wherein the step of adapting the receive-rate characteristic includes a step of storing the sub-rate data stream in a first-in-first-out (FIFO) memory.

47. The method of claim 42, further comprising a step of generating a stuffing opportunity indicator associated with the stuffing data.

48. The method of claim 47, wherein the step of framing includes a step of framing the stuffing data into the payload based on the stuffing opportunity indicator.

49. The method of claim 42, wherein the step of framing the rate-adapted data stream further comprising steps of:
framing the payload into a network frame; and
transmitting the network frame over the communication network using the selected network protocol.

50. The method of claim 42, further comprising a step of serializing the sub-rate data stream to produce a serial version of the sub-rate data stream.

51. The method of claim 50, wherein the step of serializing further comprises a step of decompressing the sub-rate data stream to form the serial version of the sub-rate data stream.

52. The method of claim 42, wherein the step of adapting the transmit-rate characteristic includes steps of:
determining a stuffing opportunity that indicates an amount of stuffing data included in the rate-adapted data stream; and
including the stuffing data in the sub-rate data stream.

53. The method of claim 52, wherein the step of adapting the transmit-rate characteristic includes a step of generating a local clock signal that is associated with the selected network protocol.

54. The method of claim 42, wherein the step of de-framing includes a step of detecting a frame marker in the payload.

55. The method of claim 42, further comprising steps of:
receiving a network frame over the communication network using the selected network protocol; and
de-framing the payload from the network frame.

56. A network element coupled to a communication network to transmit a sub-rate data stream over the communication network using a selected network protocol, wherein the communication network comprises a plurality of interconnected network elements, and wherein the sub-rate data stream has an associated sub-rate protocol, the network element comprising:
a rate adapter coupled to receive an uninterpreted sub-rate data stream and operable to, without interpretation, adapt a rate characteristic associated with a sub-rate protocol to a rate characteristic associated with a selected network protocol to generate an uninterpreted rate-adapted data stream;
a payload framer coupled to receive the uninterpreted rate-adapted data stream and operable to frame the uninterpreted rate-adapted data stream into a payload for transmission over a communication network using the selected network protocol; and
stuffing logic coupled to the rate adapter and operable to determine a stuffing indicator that indicates an amount of the uninterpreted rate-adapted data stream to be framed in the payload, wherein the stuffing indicator is responsive to the uninterpreted sub-rate data stream;
wherein the sub-rate data stream has an effective data rate equal to or less than a data rate associated with the selected network protocol.

57. A network element coupled to a communication network to receive a sub-rate data stream transmitted over the communication network using a selected network protocol, wherein the communication network comprises a plurality of interconnected network elements, and wherein the sub-rate data stream has an associated sub-rate protocol, the network element comprising:
a payload de-framer coupled to receive a payload transmitted over a communication network using a selected network protocol and to de-frame the payload into an uninterpreted rate-adapted data stream that is representative of an uninterpreted sub-rate data stream;
a rate adapter coupled to receive the uninterpreted rate-adapted data stream and operable to, without interpretation, adapt a rate characteristic associated with the selected network protocol to a rate characteristic associated with a sub-rate protocol to generate the uninterpreted sub-rate data stream from the uninterpreted rate-adapted data stream; and
stuffing logic coupled to the rate adapter and operable to determine a stuffing indicator that indicates an amount of data in the uninterpreted rate-adapted data stream to be included in the uninterpreted sub-rate data stream, wherein the stuffing indicator is responsive to the uninterpreted sub-rate data stream;
wherein the sub-rate data stream has an effective data rate equal to or less than a data rate associated with the selected network protocol.

58. A network element for switching a sub-rate data stream over a communication network that uses a selected network protocol, wherein the communication network includes a plurality of interconnected network elements, and wherein the sub-rate data stream has an associated sub-rate protocol, the network element comprising:
a payload de-framer that is coupled to receive a first payload transmitted over a communication network using a selected network protocol and to de-frame the first payload into a first uninterpreted rate-adapted data stream that is representative of an uninterpreted sub-rate data stream;
a receive rate adapter that is coupled to receive the first uninterpreted rate-adapted data stream and is operable to, without interpretation, adapt a rate characteristic associated with the selected network protocol to a rate characteristic associated with a sub-rate protocol to generate the uninterpreted sub-rate data stream from the first uninterpreted rate-adapted data stream;
a signal path coupled to the receive rate adapter;
a transmit rate adapter that is coupled to the signal path to receive the uninterpreted sub-rate data stream and is operable to, without interpretation, adapt a rate characteristic associated with the sub-rate protocol to a rate characteristic associated with the selected network protocol to generate a second uninterpreted rate-adapted data stream from the uninterpreted sub-rate data stream;
a payload framer located at the source network element that is coupled to receive the second uninterpreted rate-adapted data stream and is operable to frame the second uninterpreted rate-adapted data stream into a second payload that is transmitted over the communication network using the selected network protocol;
stuffing logic coupled to the transmit rate adapter and operable to determine a stuffing indicator that indicates an amount of the uninterpreted rate-adapted data stream to be framed in a payload, wherein the stuffing indicator is responsive to the uninterpreted sub-rate data stream; and
stuffing logic coupled to the receive rate adapter and operable to determine a stuffing indicator that indicates an amount of data in the uninterpreted rate-adapted data stream to be included in the uninterpreted sub-rate data stream, wherein the stuffing indicator is responsive to the uninterpreted sub-rate data stream;
wherein the sub-rate data stream has an effective data rate equal to or less than a data rate associated with the selected network protocol.

59. The network element of claim 58, wherein the sub-rate data stream is a first sub-rate data stream, and wherein the transmit rate adapter further comprises:
logic to receive a second sub-rate data stream having a second sub-rate protocol, and wherein the transmit rate adapter is operable to adapt a rate characteristic associated with the second sub-rate protocol to a rate characteristic associated with the selected network protocol to generate a third rate-adapted data stream from the second sub-rate data stream.

60. The network element of claim 59, wherein the payload framer includes logic to receive the third rate-adapted data stream, and wherein the payload framer is operable to frame the second rate-adapted data stream and the third rate-adapted stream into a third payload that is transmitted over the communication network using the selected network protocol.

* * * * *